US008967631B2

(12) United States Patent
Solbrack et al.

(10) Patent No.: US 8,967,631 B2
(45) Date of Patent: Mar. 3, 2015

(54) AIR ASSIST SUSPENSION

(71) Applicants: Dennis R. Solbrack, Colfax, WA (US); Christopher E. Wood, Spokane, WA (US)

(72) Inventors: Dennis R. Solbrack, Colfax, WA (US); Christopher E. Wood, Spokane, WA (US)

(73) Assignee: Papé Machinery, Eugene, OR (US)

( * ) Notice: Subject to any disclaimer, the term of this patent is extended or adjusted under 35 U.S.C. 154(b) by 33 days.

(21) Appl. No.: 13/827,256

(22) Filed: Mar. 14, 2013

(65) Prior Publication Data

US 2013/0264801 A1  Oct. 10, 2013

Related U.S. Application Data

(60) Provisional application No. 61/621,463, filed on Apr. 6, 2012.

(51) Int. Cl.
*B60G 5/04* (2006.01)
*B60G 11/27* (2006.01)
*B60G 17/017* (2006.01)

(52) U.S. Cl.
CPC *B60G 11/27* (2013.01); *B60G 5/04* (2013.01); *B60G 17/017* (2013.01); *B60G 2202/152* (2013.01); *B60G 2300/04* (2013.01); *B60G 2300/08* (2013.01); *B60G 2400/60* (2013.01); *B60G 2500/20* (2013.01)

USPC .............. 280/6.156; 180/209; 280/124.157; 280/683; 280/86.5; 280/124.116

(58) Field of Classification Search
CPC .. B60G 5/04; B60G 11/27; B60G 2204/4232; B60G 2204/423; B60G 2204/47; B60G 2204/4702; B60G 2300/04; B60G 2300/08
USPC .............. 180/209; 280/682, 683, 678, 86.5, 280/6.156, 124.157, 124.128, 124.116
See application file for complete search history.

(56) References Cited

U.S. PATENT DOCUMENTS

| 2,635,896 | A | * | 4/1953 | Tantlinger | 280/684 |
| RE25,617 | E | * | 7/1964 | Lyall | 280/683 |
| 3,784,218 | A | * | 1/1974 | Stone | 280/43.23 |
| 5,505,481 | A | * | 4/1996 | VanDenberg et al. | 280/86.5 |
| 7,950,675 | B1 | * | 5/2011 | Quenzi et al. | 280/6.157 |
| 8,033,565 | B2 | * | 10/2011 | Holroyd | 280/676 |
| 2003/0184056 | A1 | * | 10/2003 | Bowers | 280/676 |
| 2011/0038699 | A1 | * | 2/2011 | Nguyen | 414/495 |
| 2011/0266764 | A1 | * | 11/2011 | VanDenberg et al. | 280/124.111 |

* cited by examiner

Primary Examiner — Ruth Ilan

(57) ABSTRACT

Representative implementations of devices and techniques provide an air assist suspension, for use in a wide range of vehicles and implements having multiple axles (such as agricultural equipment). The air assist suspension uses one or more air bags (e.g., fluid-filled bladders, containers, pistons, and the like) to assist in adjusting the loading of the implement with respect to the multiple axles. In one embodiment, the air assist suspension also uses one or more rocker assemblies, coupled to the air bag(s) and coupled to the axles.

20 Claims, 12 Drawing Sheets

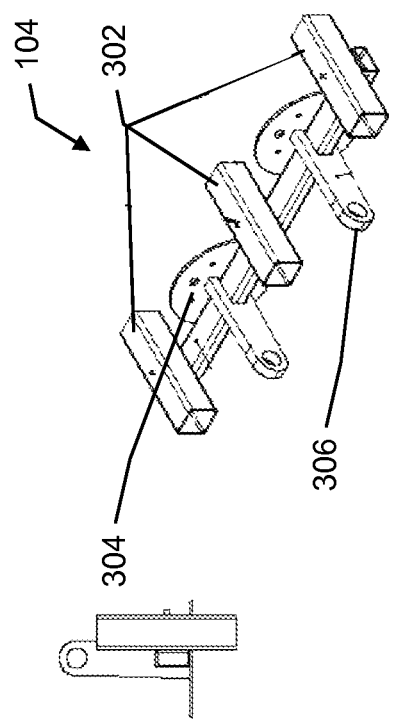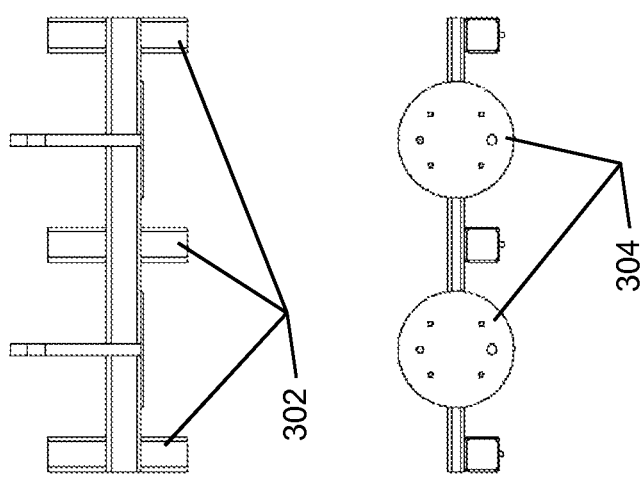
FIG. 3

AIR ASSIST SUSPENSION

PRIORITY CLAIM AND CROSS-REFERENCE TO RELATED APPLICATION

This application claims the benefit under 35 U.S.C. §119(e)(1) of U.S. Provisional Application No. 61/621,463, filed Apr. 6, 2012, which is hereby incorporated by reference in its entirety.

BACKGROUND

Various agricultural implements that are configured for working the soil, for example, may be pulled along varying terrain while operating in the field. It may be desirable for the implement to have a consistent height above grade when working the soil, for desired results.

Many such implements may include multiple axles to safely carry the load of the implement, including when transporting the implement. For example, each tire used on an implement (or a vehicle) is commonly rated for a maximum load. Additional axles of a multiple-axle arrangement allow additional tires to be used to carry the often significant load of the implement. Further, an implement that is folded for transport, for example, may have fewer wheels on the grade in the folded configuration, making multiple axles and additional tires more desirable.

When transporting the implement, it may be desirable for the implement to have a different (e.g., higher) clearance with respect to grade. In some cases, raising the implement to increase clearance can cause an unstable condition to exist with respect to the weight distribution of the implement, for example, when transporting the implement on the highway. This may also be the case with implements having multiple axles, depending on how the load is distributed to each of the axles.

BRIEF DESCRIPTION OF THE DRAWINGS

The detailed description is set forth with reference to the accompanying figures. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations and photos of the figures are for example, and others shapes and or dimensions may be used and remain within the scope of the disclosure, unless specified otherwise.

FIG. 3 illustrates several views of an example top bag support, according to one embodiment.

DETAILED DESCRIPTION

Introduction

Figure 1:
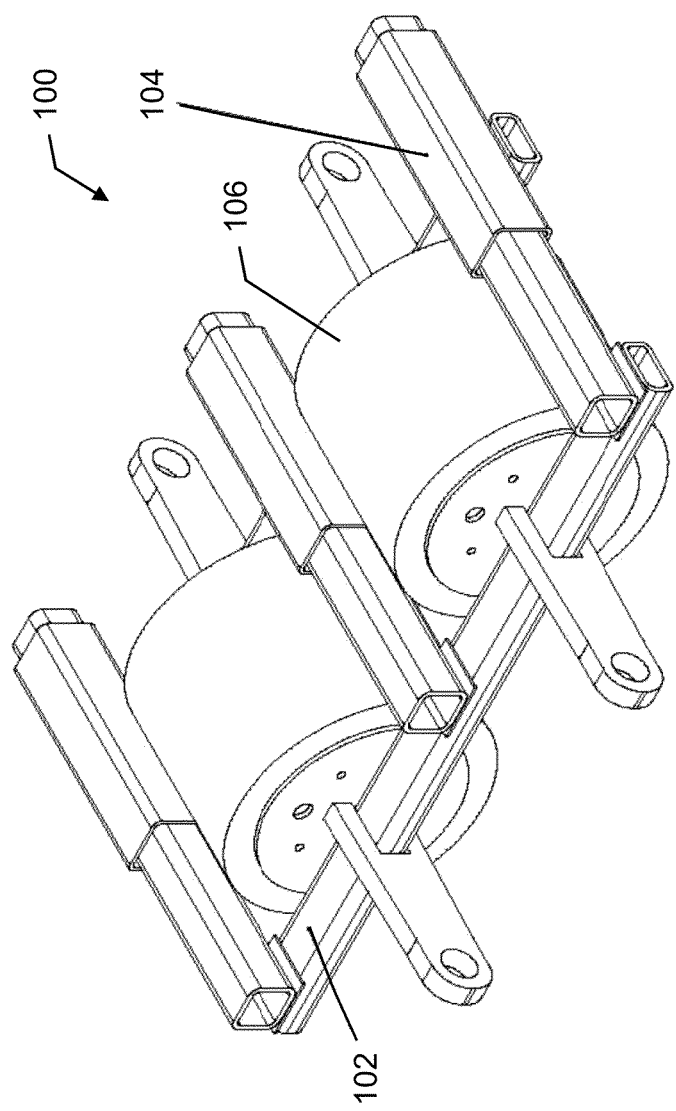
FIG. 1 is a perspective view of an example air assist suspension assembly, according to one embodiment.

An example air assist suspension is disclosed, for use in a wide range of vehicles and implements having multiple axles (such as agricultural equipment). The air assist suspension uses one or more air bags (e.g., fluid-filled bladders, containers, pistons, and the like) to assist in adjusting the loading of the implement with respect to the multiple axles. In one embodiment, the air assist suspension also uses one or more rocker assemblies, coupled to the air bag(s) and coupled to the axles.

In an embodiment, the air assist suspension controls a weight distribution between the multiple axles of the vehicle. For example, the weight carried by one or more of the multiple axles depends on the air pressure in the air bag(s) and/or the geometry of the rocker assemblies with respect to the vehicle and the axles. Changing the air pressure in the air bag(s) and/or changing the geometry of the rocker assemblies changes the percentage of weight carried by one or more of the axles.

In an example implementation, an air assist suspension includes a pressurized air bag, a first frame fixed to a first end of the air bag and pivotally coupled to a vehicle frame, and a second frame fixed to a second end of the air bag and pivotally coupled to the vehicle frame. In an embodiment, the second frame is slideably coupled to the first frame, and the air bag is arranged to provide tension against the second and first frames sliding with respect to each other.

In one embodiment, the air assist suspension includes one or more rocker assemblies arranged to pivotally couple the first and/or the second frames to the vehicle frame.

In another embodiment, the air assist suspension can raise or lower one or more of the axles, based on positioning of one or more rocker assemblies and the air pressure in the air bag(s).

Various implementations of devices and techniques for an air assist suspension are discussed in this disclosure. The devices and techniques are discussed with reference to example implementations illustrated in the figures. The devices and techniques discussed herein are referred to in the environment of an overland agriculture implement, such as a seed drill, for ease of discussion and illustrative convenience. The devices and/or techniques may also be used in other environments, with other implementations, and associated with other vehicles, systems, and the like, to provide weight distribution capabilities. For the purposes of this disclosure, the generic "vehicle" is used to represent implements, vehicles, and the like.

Advantages of the disclosed devices and techniques are varied, and include: assisting in automatically distributing a load (e.g., weight, etc.) of the load device amongst multiple axles for transport and for field use; as well as providing an optimal height with reference to grade for the implement during field use, thereby not compromising the performance of the implement in the field. For example, the implement may be lowered for field use and raised for transport, while the load on one or more of the axles of the implement is automatically adjusted when the implement is raised or lowered with reference to grade. Other advantages of the disclosed techniques may also be present.

Implementations are explained in more detail below using a plurality of examples. Although various implementations and examples are discussed here and below, further implementations and examples may be possible by combining the features and elements of individual implementations and examples.

Example Air Assist Suspension

The following description refers to the drawings shown in FIGS. 1-11. Several embodiments of air assist suspensions are described. Descriptions of the embodiments (including notes on the drawings) include examples of materials, types of fabrication, and dimensions. However, the descriptions are for ease of understanding and are not intended to be limiting. Other suitable materials, types of fabrication, and dimensions may be used to construct an air assist suspension without departing from the scope of this disclosure.

FIG. 1 is a perspective view of an example air assist suspension assembly 100, according to one embodiment. The illustration shows an air bag frame 102 (i.e., a first frame), a top bag support 104 (i.e., a second frame) and one or more air bags 106. In alternate implementations, additional or alternate components may be used to accomplish the techniques described herein. The air assist suspension assembly may be coupled to two or more axles of the vehicle via one or more rocker assemblies (500), as discussed below.

In an embodiment, the air bag frame 102 and the top bag support 104 are slideably coupled to each other, and fixed to either end of the air bag(s) 106. In one embodiment, the air bag(s) 106 are located such that they provide a tension between the air bag frame 102 and the top bag support 104. For example, the air bag(s) 106 may be arranged to provide tension against the second frame 104 and the first frame 102 sliding with respect to each other. In various implementations, one pressurized air bag 106 or multiple pressurized air bags 106 are arranged to provide tension against the air bag frame 102 and the top bag support 104 sliding with respect to each other.

Figure 2:
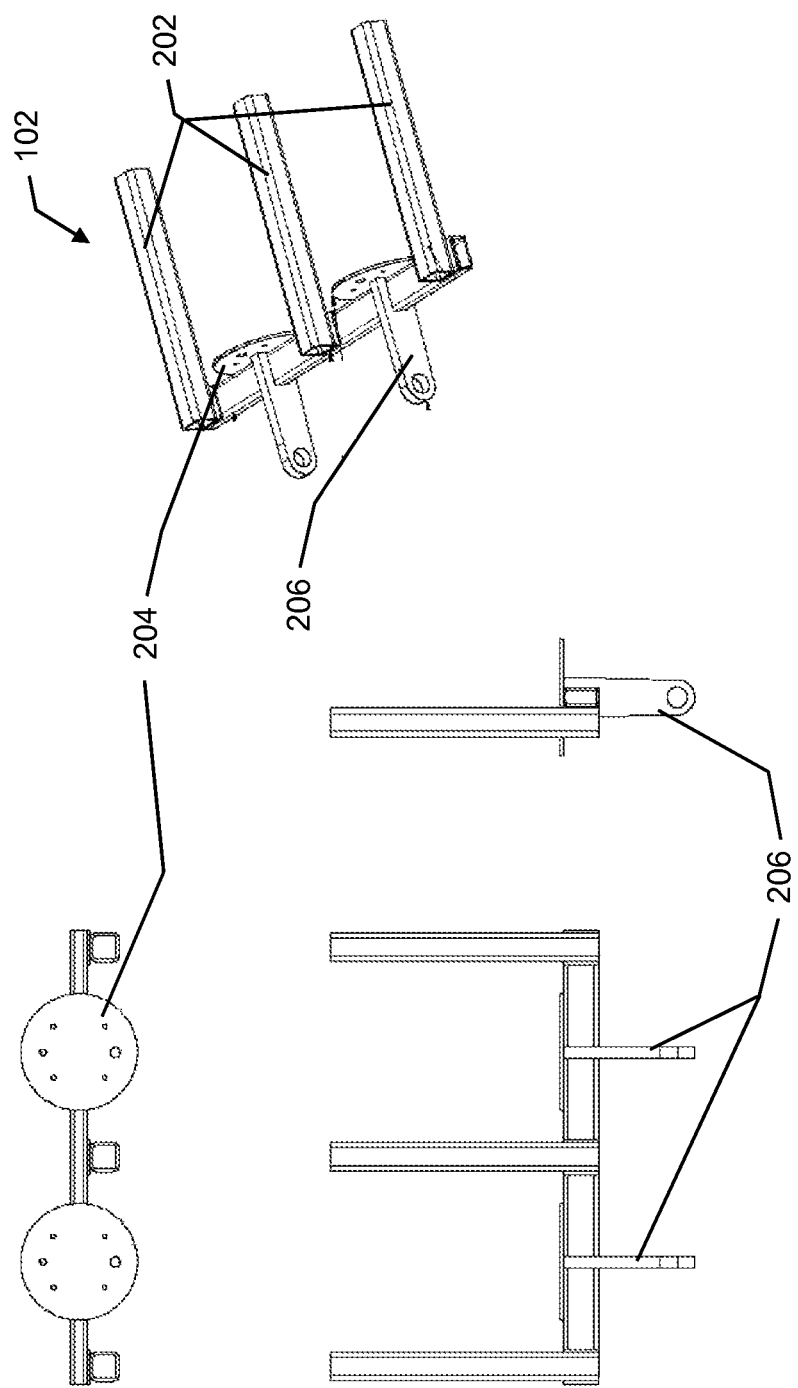
FIG. 2 illustrates several views of an example suspension air bag frame, according to one embodiment.
Figure 4:
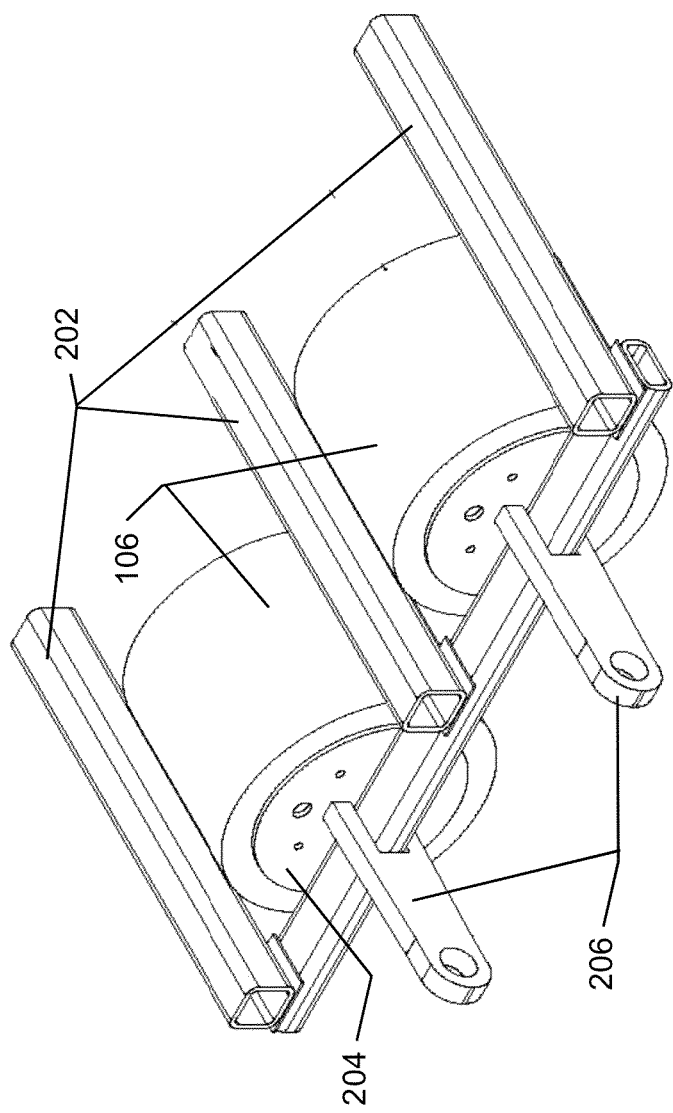
FIG. 4 is a perspective view of an example air bag assembly according to an embodiment.

Referring to FIGS. 2 through 4, the air bag frame 102 includes one or more rails 202 and the top bag support 104 includes a same number of sleeves 302. In an embodiment, the rails 202 slide inside the sleeves 302. The air bag(s) 106 provide resistance against the sliding of the sleeves 302 with respect to the rails 202. The air bag(s) 106 attach on one end to plates 204 at the air bag frame 102 as shown in FIG. 4, and on the other end to the plates 304 at the top bag support 104. In one implementation, the air bag frame 102 is pivotally coupled to at least one rocker assembly 500 using one or more hinges 206. In another implementation, the top bag support 104 is pivotally coupled to another rocker assembly 500 using one or more hinges 306.

In alternate implementations, one or more rocker assemblies 500 may be used with an air assist suspension assembly 100. For example, one end of the air assist suspension assembly 100 may be pivotally coupled to a rocker assembly 500 and the other end of the air assist suspension assembly 100 may be coupled to the vehicle (either pivotally or fixed). In one example implementation, a rocker assembly 500 is arranged to pivotally couple at least one of the first frame 102 and the second frame 104 to the vehicle frame. In other implementations, multiple rocker assemblies 500 are arranged to pivotally couple the first frame 102 and the second frame 104 to the vehicle frame. For example, each of the first 102 and second 104 frames may be pivotally coupled to the vehicle frame via a rocker assembly 500. In various implementations, the air assist suspension assembly 100 may be used with alternate components and/or assemblies and remain within the scope of the disclosure, and accomplish the techniques described herein.

Figure 5:
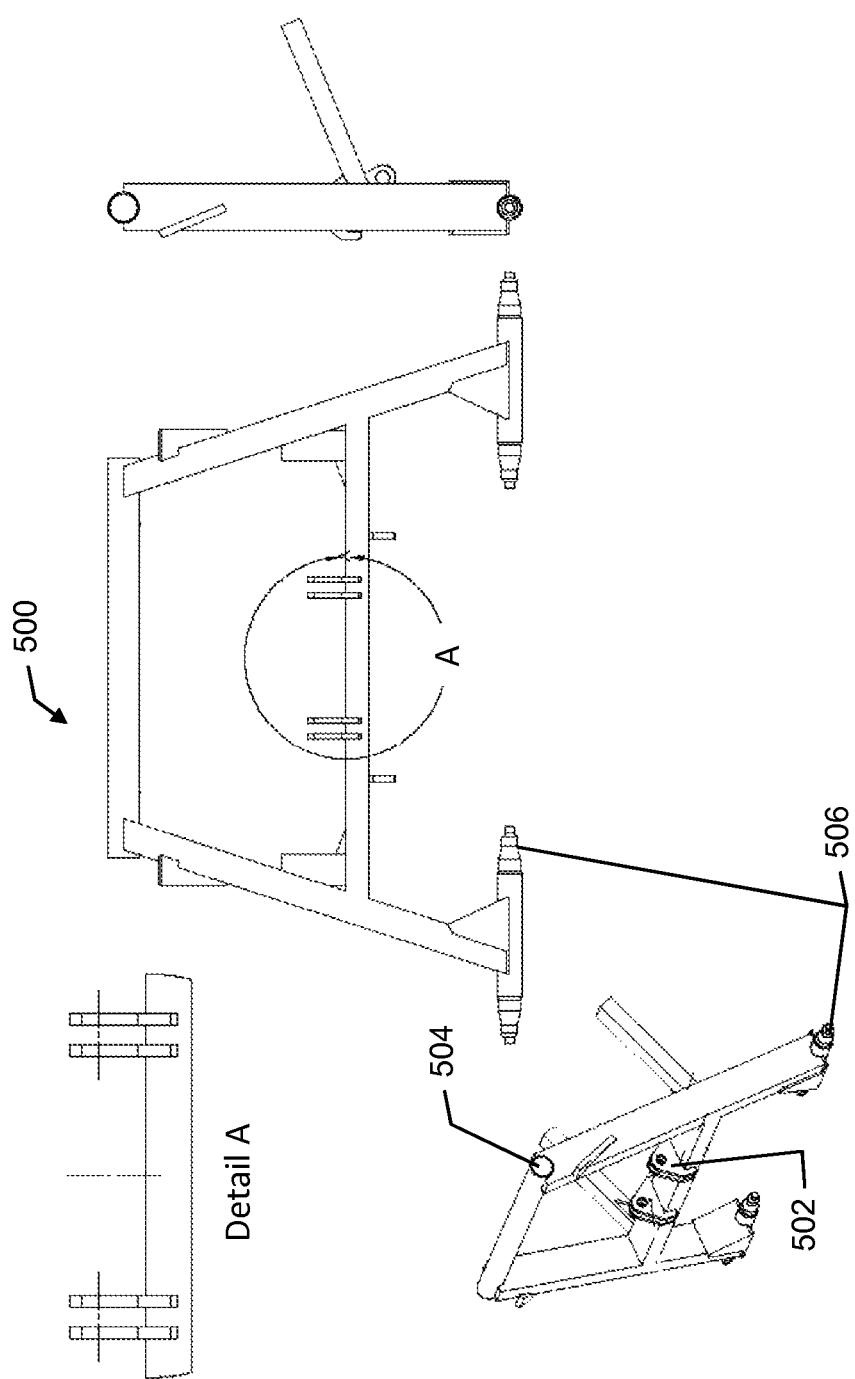
FIG. 5 illustrates several views of an example rocker assembly, according to one embodiment.

FIG. 5 illustrates several views of an example rocker assembly 500, according to one embodiment. In one implementation, a rocker assembly 500 may be pivotally coupled to an axle of the vehicle via joints 506. The rocker assembly 500 may also be pivotally coupled to the vehicle frame via joints 504. Further, the air assist suspension assembly 100 may be pivotally coupled to the rocker assembly 500 via hinges 502. In one implementation, each of multiple rocker assemblies 500 are coupled to individual axles of the vehicle.

Figure 6:
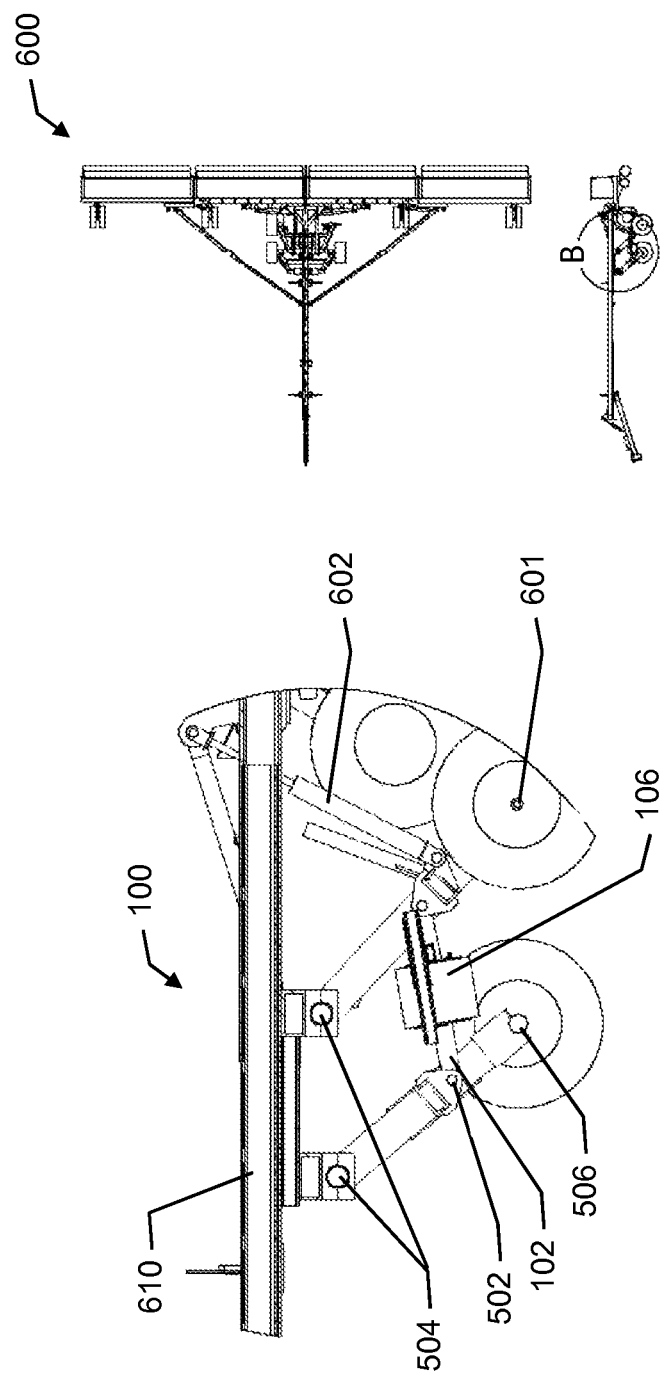
FIG. 6 illustrates a side view of an example air assist suspension assembly, and includes top and side views of the air assist suspension assembly installed in a seed drill.

FIG. 6 illustrates a side view of an example air assist suspension assembly 100, and includes top and side views of the air assist suspension assembly 100 installed in a seed drill 600 (i.e., "vehicle"), for example. The illustration of FIG. 6 is not intended to be limiting. In various implementations, an air assist suspension assembly 100 may include fewer, additional, or alternate components and remain within the scope of the disclosure. For example, in some implementations, the air assist suspension assembly 100 may include one or more springs, shock-absorbers, and the like, or combinations of springs, shock-absorbers, air bags 106, and the like, in various configurations. As mentioned above, the air assist suspension assembly 100 may be used with any of various land vehicles, including on and off road vehicles, farm vehicles and farm implements, as well as air vehicle landing gear, and the like.

In FIG. 6, the air assist suspension assembly 100 is shown pivotally coupled to the frame 610 of the seed drill 600 at joints 504 of the rocker assemblies 500. Additionally, the axles 601 of the seed drill 600 are pivotally coupled to the rocker assemblies 500 at joints 506 of the rocker assemblies 500. The air bag frame 102 is shown pivotally coupled to the rocker assembly 500 at hinge 502.

As shown in FIG. 6, in some implementations, one or more actuators 602 (e.g., cylinder, piston, etc.) may be coupled to the vehicle 600 frame 610 at one end, and coupled to the air assist suspension assembly 100 (directly or indirectly) at the other end. The actuator 602 may be used to change the geometry of the suspension of the vehicle 600, as discussed further below. The actuator 602 may be pneumatic, hydraulic, mechanical, electronic, and the like, or various combinations thereof. In various implementations, the actuator 602 may be adjusted manually or automatically to make changes to the suspension geometry.

In one implementation, as shown in FIGS. 6 and 8-10, the one or more actuators 602 are coupled to at least a first rocker assembly and/or a second rocker assembly and are arranged to adjust a distance of the vehicle frame 610 from one or both of the first axle and the second axle. In an embodiment, the one or more actuators 602 are arranged to adjust the loading of the first axle and/or the second axle while the air bag 106 maintains a constant pressurization. For example, the one or more actuators 602 may be arranged to rotate the first rocker assembly 500 and/or the second rocker assembly 500 with respect to the frame 610 of the vehicle, and to adjust an angle of the first rocker assembly 500 and/or the second rocker assembly 500 to the frame 610 of the vehicle. In the example, an increase in the angle (measured behind the respective joint 504 or respective axle 601, e.g., towards the rear of the implement) of the first rocker assembly 500 and/or the second rocker assembly 500 to the frame 610 of the vehicle increases a loading on the first axle (i.e., the front axle in FIGS. 6 and 8-10) and decreases a loading on the second axle (i.e., the rear axle in FIGS. 6 and 8-10) and a decrease in the angle (measured behind the respective joint 504 or respective axle 601, e.g., towards the rear of the implement) of the first rocker assembly and/or the second rocker assembly to the frame 610 of the vehicle decreases a loading on the first axle and increases a loading on the second axle. (Alternately, if the angle is measured ahead of the respective joint 504 or respective axle 601, e.g., towards the front of the implement, increasing or decreasing the angle will have the opposite effect on the loading of the first and second axles.)

In another implementation, the one or more actuators 602 are arranged to determine a height of a load device (e.g., the seed drill) to grade by adjusting a loading of the first axle with respect to the second axle. For example, the load device may be coupled to the frame 610 of the vehicle. In one embodiment, increasing the distance of the first axle and/or the second axle with respect to the frame 610 of the vehicle automatically transfers a portion of the load from the second axle to the first axle and decreasing the distance of the first axle and/or the second axle with respect to the frame 610 of the vehicle automatically transfers a portion of the load from the first axle to the second axle.

In a further implementation, the one or more actuators 602 are arranged to adjust an angle of the air bag 106 with respect to the frame 610 of the vehicle. For example, in the implementation, an increase in the angle of the air bag to the frame 610 of the vehicle increases a loading on the first axle and decreases a loading on the second axle and a decrease in the angle of the air bag to the frame 610 of the vehicle decreases a loading on the first axle and increases a loading on the second axle.

In an alternate implementation, the air bag 106 is arranged to adjust a loading of the first axle with respect to the second axle by adjusting a pressurization of the air bag, as discussed below.

Figure 7:
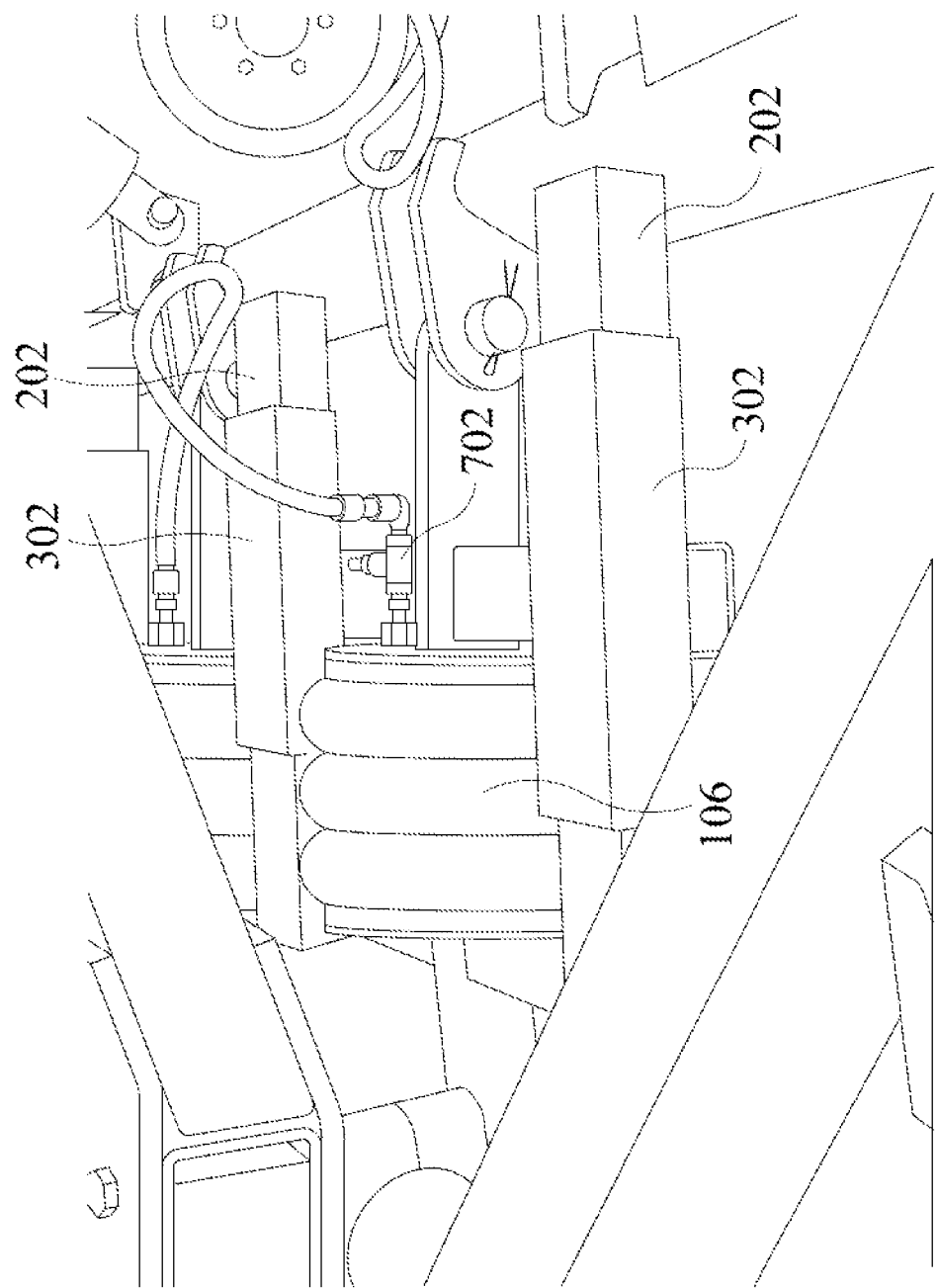
FIG. 7 illustrates a view of the air bag assembly, as coupled to other components and installed in a seed drill.

FIG. 7 illustrates a view of the air bag 106, as coupled to other components and installed in a seed drill 600, according to an embodiment, for example. The air bags 106 may have an air fitting 702, for injecting and releasing air (or other gases, fluids, etc.) into and from the air bags 106. In various implementations, air may be injected and/or released manually and/or automatically to achieve the desired air pressure within the air bags 106.

Figure 8:
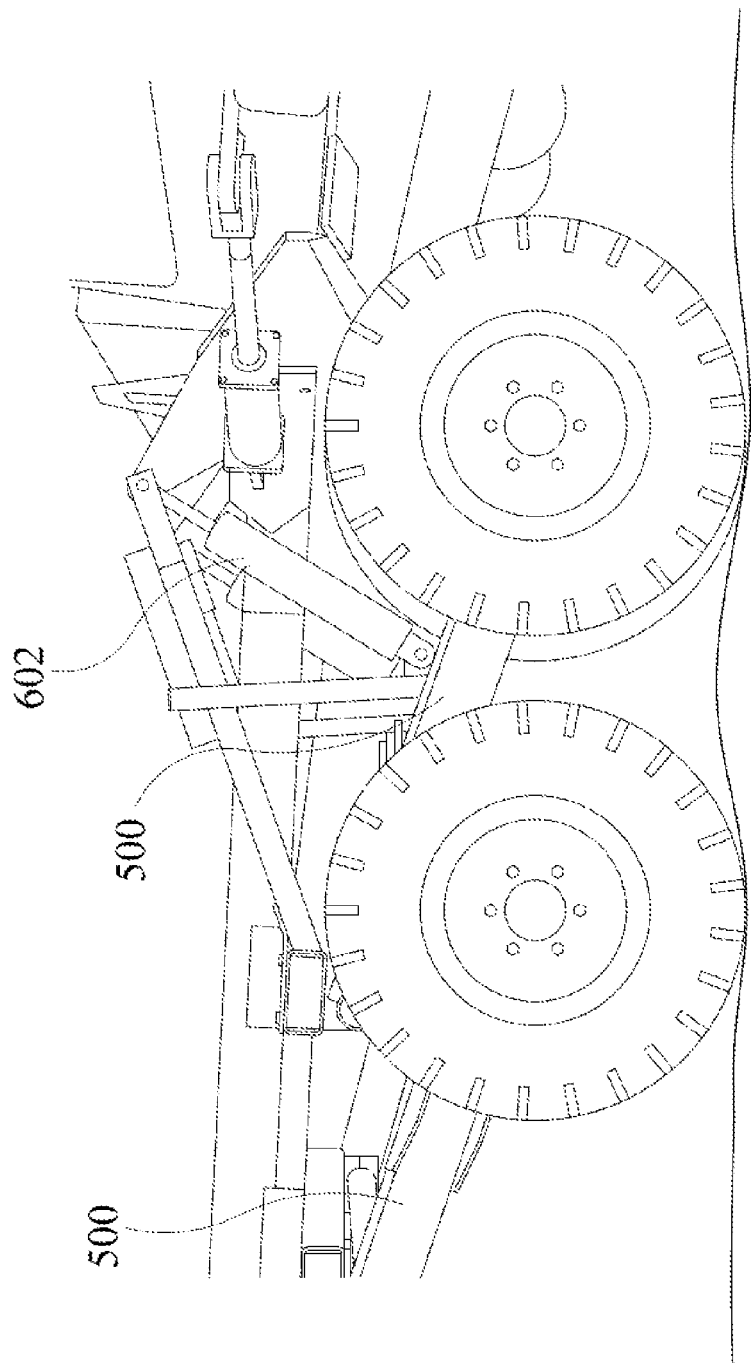
FIG. 8 illustrates a view of the air assist suspension assembly, as installed in a seed drill. The illustration shows the assembly in a lowered field position.

FIG. 8 illustrates a view of the air assist suspension assembly 100, as installed in a seed drill 600, for example. The illustration of FIG. 8 shows the air assist suspension assembly 100 adjusted to a lowered "field" position. The actuator 602 is shown in a contracted position, and the rocker assemblies 500 are shown at a shallow angle with respect to the grade. Additionally, the vehicle 600 height is low with respect to the axles. With the example of a seed drill 600, the field position represents the position for working the soil during normal operation.

In the field position, all wheels may be in contact with the grade. However, the load carried by each axle in the field position depends on the air pressure in the air bags 106 and the geometry of the suspension. For example, although all wheels may be in contact with the grade, a greater portion of the weight of the vehicle 600 may be carried on the rearmost axle(s) in the field position.

Figure 9:
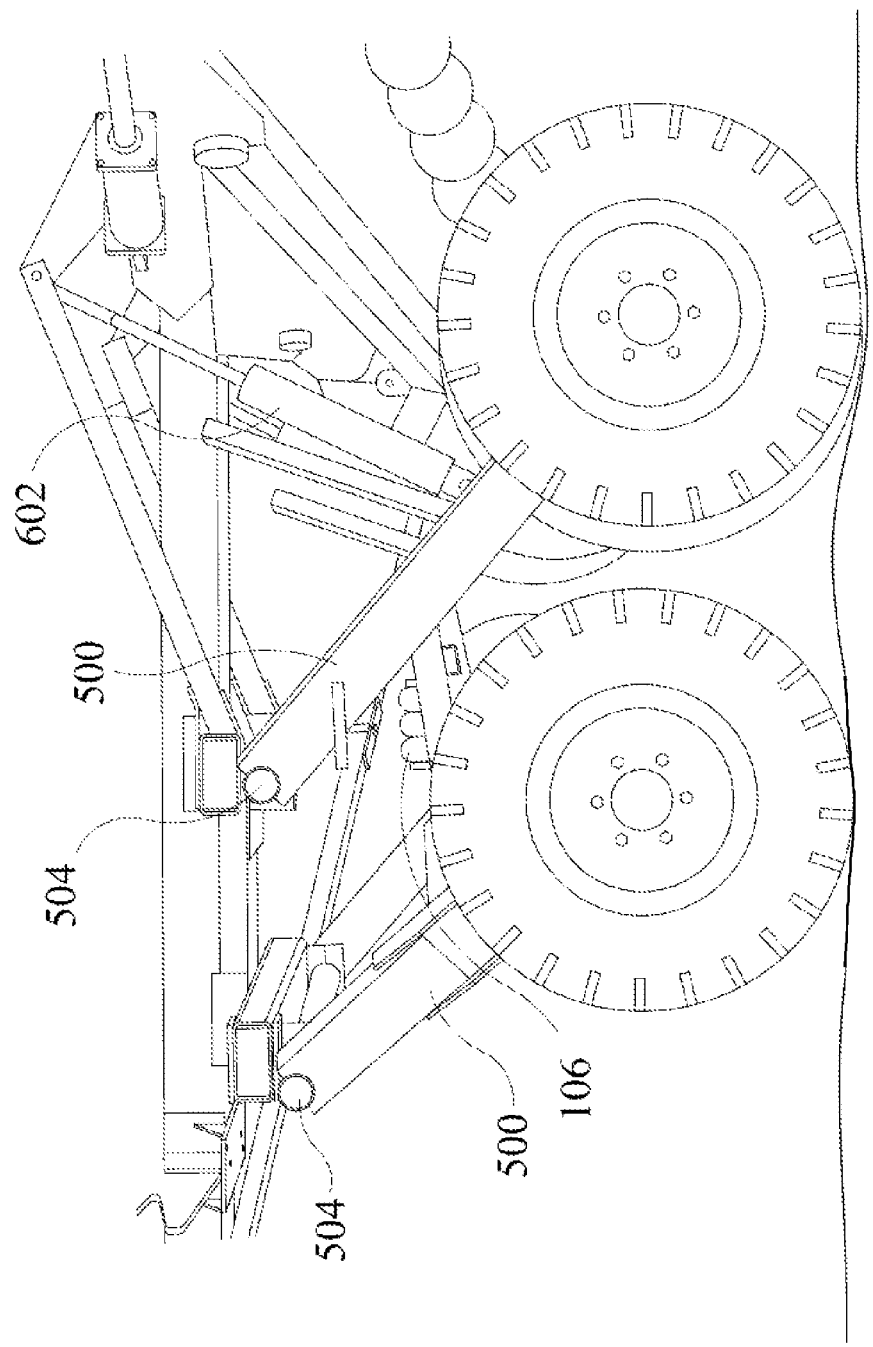
FIG. 9 illustrates a view of the air assist suspension assembly, as installed in a seed drill. The illustration shows the assembly in a raised position, as if the implement is going over an object, for example.

FIG. 9 illustrates a view of the air assist suspension assembly 100, as installed in a seed drill 600, for example. The illustration of FIG. 9 shows the air assist suspension assembly 100 in a raised (i.e., transport) position. The actuator 602 is shown in an extended position, and the rocker assemblies 500 are shown at a greater angle with respect to the grade. Additionally, the vehicle 600 height is higher with respect to the axles. With the example of a seed drill 600, the transport position represents the position for transporting the seed drill between jobs.

In the transport position, all wheels may be in contact with the grade. However, the load carried by each axle in the raised position depends on the pressure of the air bags 106 and the geometry of the suspension. For example, although all wheels may be in contact with the grade, an equal or greater portion of the weight of the vehicle 600 may be carried on the frontmost axle(s) than the rearmost axle(s) in the transport position.

Figure 10:
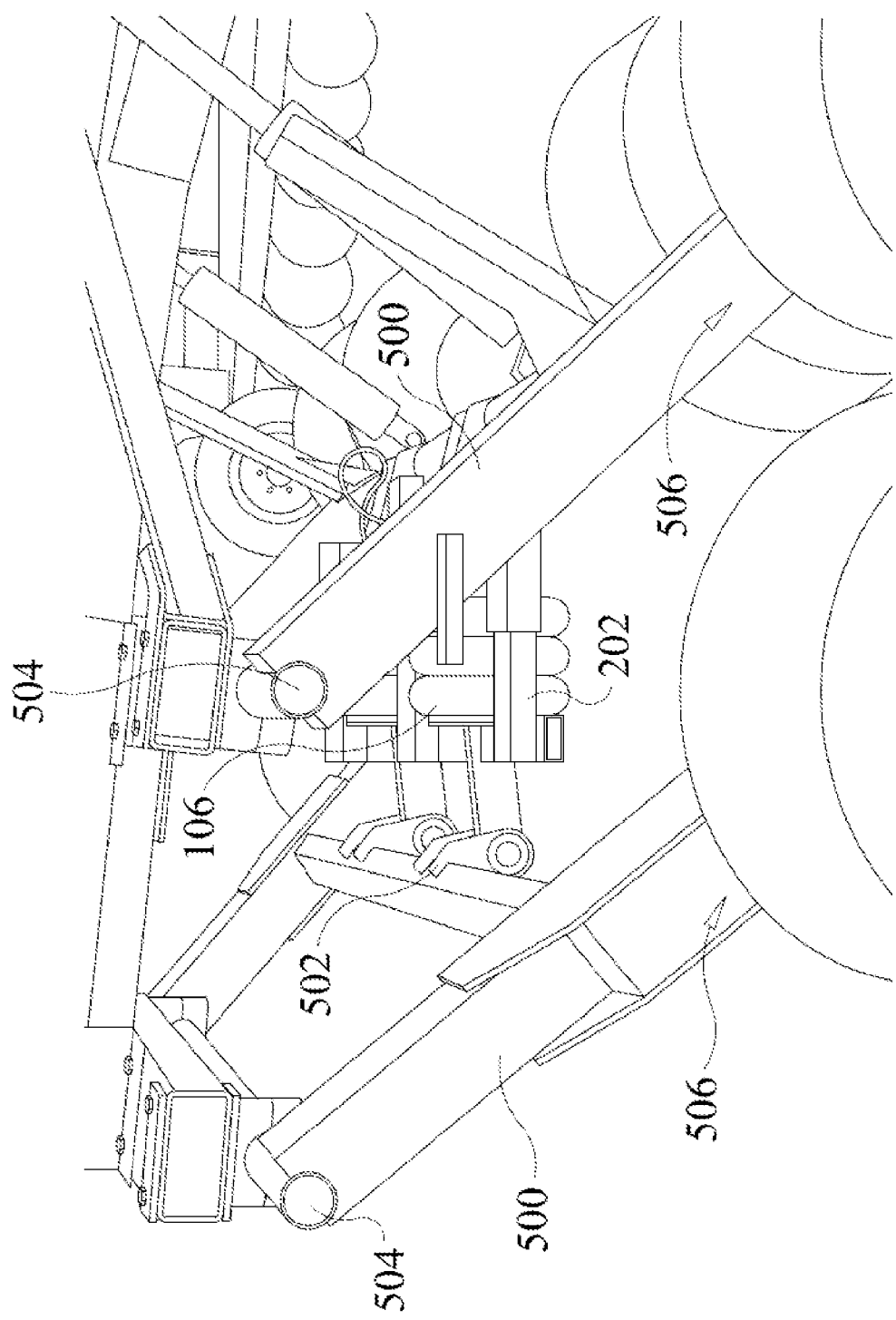
FIG. 10 illustrates a detailed view of the air assist suspension assembly, as installed in a seed drill. The illustration shows the assembly in a raised transport position.

FIGS. 9 and 10 illustrate the rocker assemblies 500 pivoting at the joints 504 and 506 as the vehicle 600 is adjusted from the field position to the transport position. Also, the air assist suspension assembly 100 pivots at hinges 502/206 and 502/306 as the vehicle 600 is adjusted from the field position to the transport position.

Figure 11:
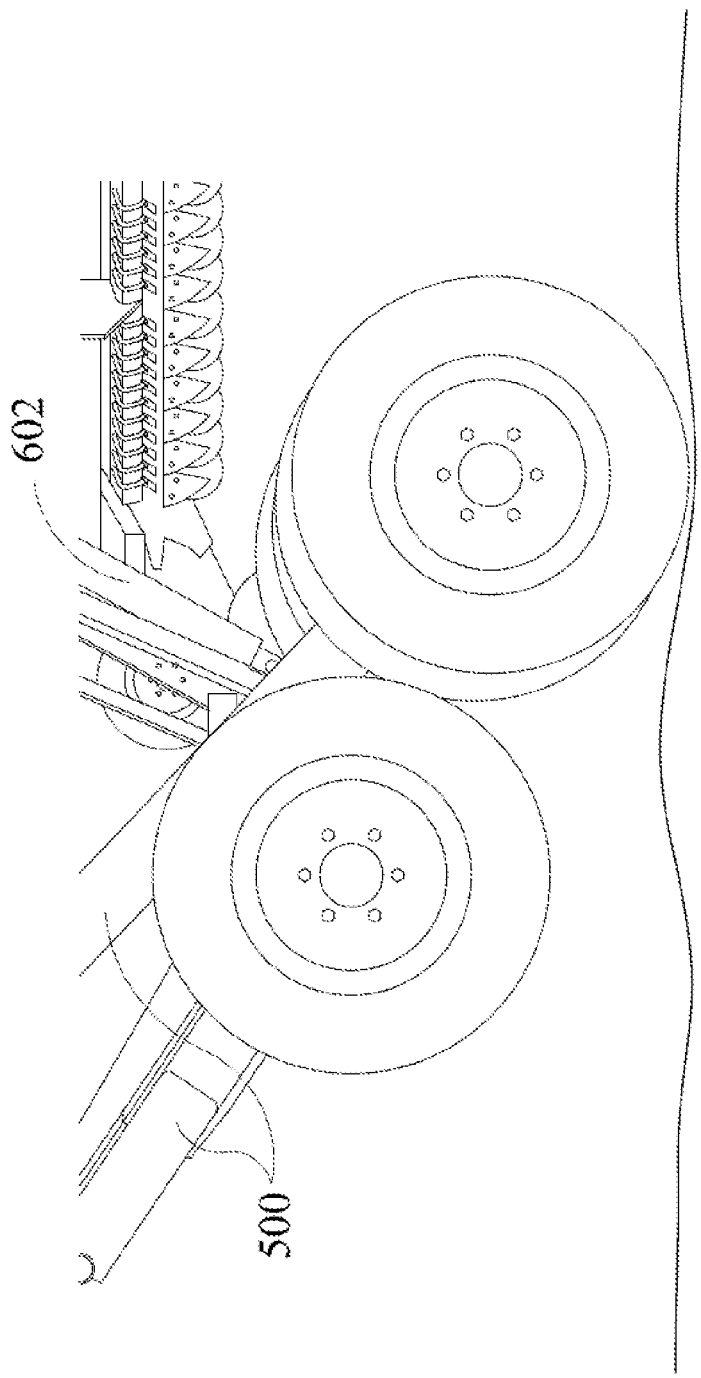
FIG. 11 illustrates a view of the air assist suspension assembly, as installed in a seed drill. The illustration shows the assembly in a raised position, with the front axle raised off the grade.

FIG. 11 illustrates a view of the air assist suspension assembly 100, as installed in a seed drill, for example. The illustration shows the air assist suspension assembly 100 in a raised position, with the front axle raised off the grade. Using the actuator 602 to adjust the geometry of the suspension and adjusting the air pressure in the air bag(s) 106, the front wheels may be raised off the grade by shifting most or all of the weight to the rear axles, for example. In various configurations (e.g., positions, etc.) of the actuator 602 and/or the rocker assemblies 500, the front axle may be raised, lowered, or maintain contact with the grade. In various implementations, the height of the implement or vehicle is determined by the rear wheels. In such implementations, the front axle is arranged to assist in carrying the load when needed, but has little or no influence on the implement (or vehicle) height.

For example, in one implementation, by increasing the air pressure in the air bag(s) 106, the weight of the vehicle 600 is increasingly shifted to the front axle(s). Conversely, by decreasing the air pressure in the air bag(s) 106, the weight of the vehicle 600 is increasingly shifted to the rear axle(s). In alternate implementations, other weight distribution adjustments may be made by changes to the suspension geometry and the air pressure in the air bag(s) 106.

Example Operation

In one implementation, the air pressure (fluid pressure, tension, etc.) may be kept constant in the air bag(s) 106, and weight shifting or changes to loading of the axles may be accomplished by changes to the geometry of the suspension. In one embodiment, the air in the air bag(s) 106 may be kept constant at 45 psi, for example. In other embodiments, other pressure or tension values may be used as desired.

In an embodiment, when the vehicle 600 is in the field or lowered position, the actuator 602 is in a contracted position, causing the vehicle frame 610 to be lower to the grade, and closer to the axles. In this position, as shown in FIG. 8, the rocker assemblies 500 are at a small angle with respect to the grade, and may be nearly parallel with the grade. The air bag(s) 106 provide tension between the rocker assemblies 500, as well as between the axles. However, with the angle of the air assist suspension assembly 100 to the rocker assemblies 500, the tension is not effective in significantly loading the frontmost axle(s). The weight of the vehicle 600 rests mostly on the rearmost axle(s), with the front axle(s) generally following the contours of the grade, and bearing less than half of the weight of the vehicle 600.

In an embodiment, the actuator(s) 602 may be used to control the height of the vehicle 600 with respect to the grade (including attached equipment, drills, etc.). In the field position, a seed drill 600, for example, is in position for working the soil.

Extending the actuator(s) 602, as shown in FIGS. 9 and 10, lifts the vehicle 600 frame 610 and causes the rocker assemblies 500 to pivot at the axles to a greater angle with respect to the grade. Additionally, the angle of the air assist suspension assembly 100 changes with respect to the rocker assemblies 500, as it pivots at hinges 502/206 and 502/306. The change in angle of the air assist suspension assembly 100 with respect to the rocker assemblies 500 shifts weight from the rearmost axle(s) to the frontmost axle(s). If the actuator(s) 602 are further extended, the frontmost axles will bear greater than half of the vehicle 600 weight at the extreme extension of the actuator(s) 602.

In the example of a seed drill 600, the loaded (full of grain) weight on the frontmost axle in the field position may be on the order of 1500 lbs., whereas the loaded weight on the frontmost axle in the transport position may be on the order of 5200 lbs. In such an implementation, the weight distribution may be approximately 1:4 (field position to transport position). In alternate embodiments, other weight distributions are possible with the air assist suspension assembly 100.

In another embodiment, the air pressure may be varied in the air bag(s) 106 to adjust loading of the vehicle suspension, in conjunction with the geometry changes mentioned above. As discussed above, the weight of the vehicle 600 may be shifted to the front axle(s) by increasing the air pressure in the air bag(s) 106, and shifted to the rear axle(s) by decreasing the air pressure in the air bag(s) 106. For example, in one implementation, all of the vehicle 600 weight may be loaded onto an axle by combining suspension geometry with air bag pressure as discussed.

In one embodiment, the air pressure in the air bag(s) and or the position of the actuator(s) 602 may be adjusted automatically using a controller (not shown), such as a microprocessor, or the like. For example, a controller may be arranged to accept input from a user, and adjust the loading of the suspension according to the input received, by adjusting the air pressure in the air bag(s) via an onboard air compressor (not shown) or the like, and/or the geometry of the suspension via the actuator(s) 602. Input to the controller may be made with a user interface and include specific loading values or percentages, gradient (lesser or greater) loading inputs (with respect to one or more of the axles), pre-programmed settings (e.g., field mode and transport mode, etc.), and the like.

Additionally or alternatively, the loading inputs may be derived from signals received from sensors (not shown) mounted to the vehicle 600 and/or the suspension. For example, the controller may cause axle loading to be adjusted as the vehicle 600 experiences changes in acceleration, incline, and the like, based on sensor signals received by the controller.

As discussed above, the techniques, components, and devices described herein with respect to the implementations are not limited to the illustrations of FIGS. 1-11, and may be applied to other air assist suspension devices, and designs, without departing from the scope of the disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that an air assist suspension assembly 100 may be implemented as a stand-alone device or as part of another system (e.g., integrated with other components, systems, suspensions, etc.). In various implementations, additional or alternative components may be used to accomplish the disclosed techniques and arrangements.

Representative Process

Figure 12:
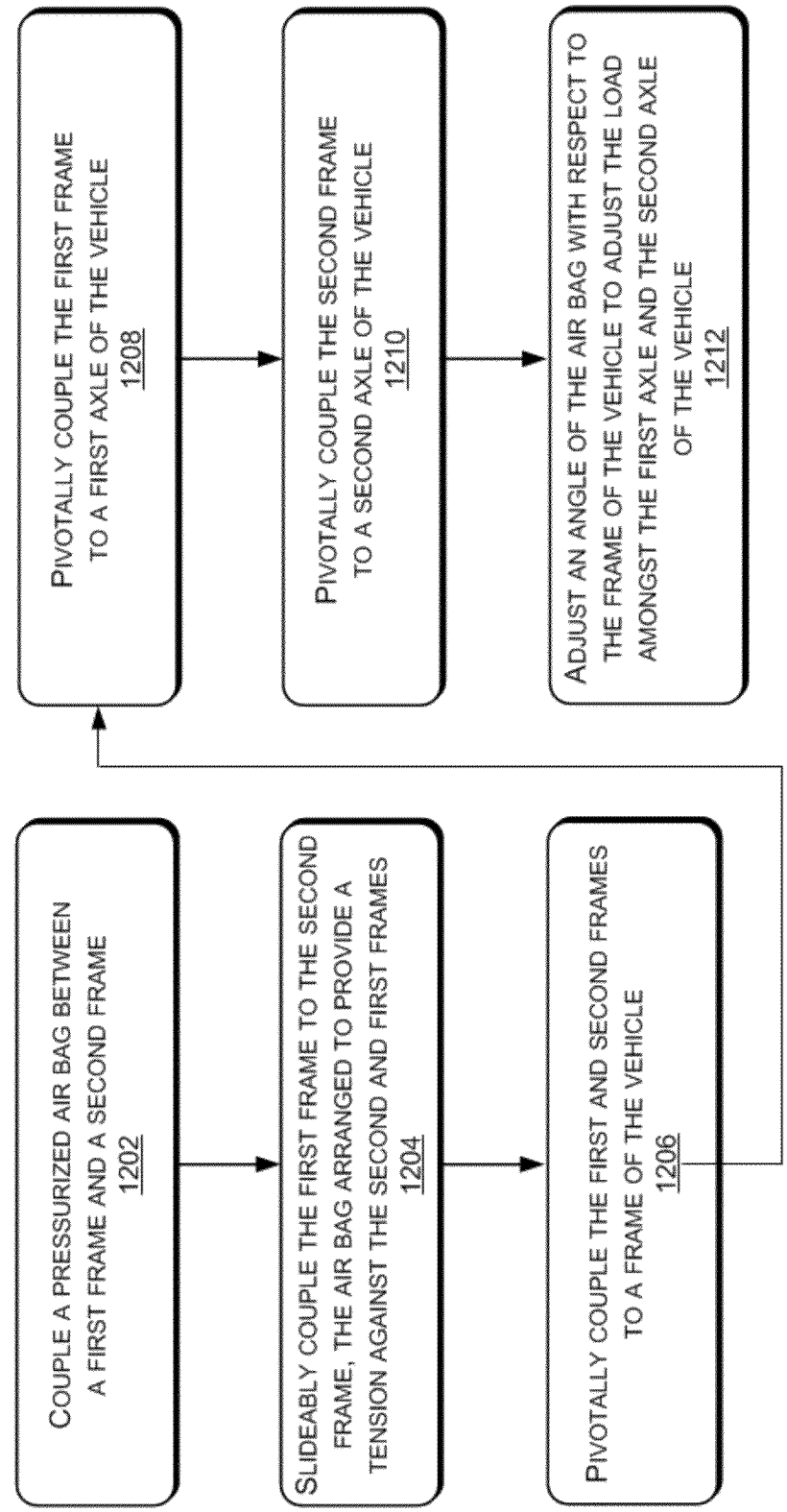
FIG. 12 is a flow diagram illustrating an example process for distributing a load amongst multiple axles of a vehicle, according to various implementations.

FIG. 12 is a flow diagram illustrating an example process 1200 for distributing a load amongst multiple axles of a vehicle, according to various implementations. The process 1200 describes using a pressurized air bag (such as air bag 106, for example) within a framework. For example, the framework is allowed to pivot at particular points, as it is coupled to a frame (such as frame 610, for example) of the vehicle, where the pivoting changes loading of the multiple axles of the vehicle. The process 1200 is described with reference to FIGS. 1-11.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 1202, the process 1200 includes coupling a pressurized air bag between a first frame (such as air bag frame 102, for example) and a second frame (such as top bag support 104, for example).

At block 1204, the process includes slideably coupling the first frame to the second frame. In an implementation, the air bag is arranged to provide a tension against the second and first frames sliding with respect to each other.

At block 1206, the process includes pivotally coupling the first and second frames to a frame of the vehicle (such as frame 610, for example).

At block 1208, the process includes pivotally coupling the first frame to a first axle (such as a first axle 601, for example) of the vehicle and at block 1210, the process includes pivotally coupling the second frame to a second axle (such as another axle 601, for example) of the vehicle. In one implementation, the first axle is a front axle of the vehicle and the second axle is a rear axle of the vehicle.

At block 1212, the process includes adjusting an angle of the air bag with respect to the frame of the vehicle to adjust the load amongst the first axle and the second axle of the vehicle.

In one implementation, the process includes pivotally coupling a first rocker assembly (such as rocker assembly 500, for example) to the first frame, and pivotally coupling the first rocker assembly to the frame of the vehicle and to the first axle of the vehicle. In another implementation, the process includes pivotally coupling a second rocker assembly (such as another rocker assembly 500, for example) to the second frame, and pivotally coupling the second rocker assembly to the frame of the vehicle and to the second axle of the vehicle.

In an implementation, the process includes increasing an angle of the first and/or second rocker assemblies with respect to the frame of the vehicle to transfer a portion of the load from the second axle to the first axle and decreasing the angle of the of the first and/or second rocker assemblies with respect to the frame of the vehicle to transfer a portion of the load from the first axle to the second axle.

In another implementation, the process includes increasing the angle of the air bag with respect to the frame of the vehicle to transfer a portion of the load from the second axle to the first axle and decreasing the angle of the air bag with respect to the frame of the vehicle to transfer a portion of the load from the first axle to the second axle.

In a further implementation, the process includes increasing the distance of the first axle and/or the second axle with respect to the frame of the vehicle to transfer a portion of the load from the second axle to the first axle and decreasing the distance of the first axle and/or the second axle with respect to the frame of the vehicle to transfer a portion of the load from the first axle to the second axle.

In alternate implementations, other techniques may be included in the process 1200 in various combinations, and remain within the scope of the disclosure.

Conclusion

While various discreet embodiments have been described throughout, the individual features of the various embodiments may be combined to form other embodiments not specifically described. The embodiments formed by combining the features of described embodiments are also air assist suspensions.

What is claimed is:

1. An apparatus, comprising:
   a pressurized air bag;
   a first frame fixed to a first end of the air bag and pivotally coupled to a vehicle frame; and
   a second frame fixed to a second end of the air bag and pivotally coupled to the vehicle frame, the second frame slideably coupled to the first frame, the air bag arranged to provide tension against the second and first frames sliding with respect to each other.

2. The apparatus of claim 1, further comprising a rocker assembly arranged to pivotally couple at least one of the first and second frames to the vehicle frame.

3. The apparatus of claim 2, wherein the rocker assembly is coupled to an axle of the vehicle.

4. The apparatus of claim 2, further comprising a second rocker assembly arranged to pivotally couple the other of the first and second frames to the vehicle frame.

5. The apparatus of claim 4, wherein the second rocker assembly is coupled to another axle of the vehicle.

6. The apparatus of claim 1, further comprising one or more additional pressurized air bags arranged to provide tension against the second and first frames sliding with respect to each other.

7. An apparatus, comprising:
   a pressurized air bag;
   a first frame fixed to a first end of the air bag;
   a second frame fixed to a second end of the air bag and slideably coupled to the first frame, the air bag arranged to provide tension against the second and first frames sliding with respect to each other;
   a first rocker assembly pivotally coupled to the first frame and pivotally coupled to a frame of a vehicle and coupled to a first axle of the vehicle; and
   a second rocker assembly pivotally coupled to the second frame and pivotally coupled to the frame of the vehicle and coupled to a second axle of the vehicle.

8. The apparatus of claim 7, further comprising one or more actuators coupled to at least the first rocker assembly and the second rocker assembly and arranged to adjust a distance of the vehicle frame from the first axle and/or the second axle.

9. The apparatus of claim 8, wherein the one or more actuators are arranged to adjust a loading of the first axle and/or the second axle while the air bag maintains a constant pressurization.

10. The apparatus of claim 8, wherein the one or more actuators are arranged to rotate the first rocker assembly and/or the second rocker assembly with respect to the frame of the vehicle, and to adjust an angle of the first rocker assembly and/or the second rocker assembly to the frame of the vehicle.

11. The apparatus of claim 10, wherein an increase in the angle of the first rocker assembly and/or the second rocker assembly to the frame of the vehicle increases a loading on the first axle and decreases a loading on the second axle and a decrease in the angle of the first rocker assembly and/or the second rocker assembly to the frame of the vehicle decreases a loading on the first axle and increases a loading on the second axle.

12. The apparatus of claim 8, wherein the one or more actuators are arranged to determine a height of a load device to grade by adjusting a loading of the first axle with respect to the second axle, the load device coupled to the frame of the vehicle.

13. The apparatus of claim 8, wherein the one or more actuators are arranged to adjust an angle of the air bag with respect to the frame of the vehicle.

14. The apparatus of claim 13, wherein an increase in the angle of the air bag to the frame of the vehicle increases a loading on the first axle and decreases a loading on the second axle and a decrease in the angle of the air bag to the frame of the vehicle decreases a loading on the first axle and increases a loading on the second axle.

15. The apparatus of claim 8, wherein the air bag is arranged to adjust a loading of the first axle with respect to the second axle by adjusting a pressurization of the air bag.

16. A method of distributing a load amongst multiple axles of a vehicle, comprising:
   coupling a pressurized air bag between a first frame and a second frame;
   slideably coupling the first frame to the second frame, the air bag arranged to provide a tension against the second and first frames sliding with respect to each other;
   pivotally coupling the first and second frames to a frame of the vehicle;
   pivotally coupling the first frame to a first axle of the vehicle;
   pivotally coupling the second frame to a second axle of the vehicle; and
   adjusting an angle of the air bag with respect to the frame of the vehicle to adjust the load amongst the first axle and the second axle of the vehicle.

17. The method of claim 16, further comprising pivotally coupling a first rocker assembly to the first frame, and pivotally coupling the first rocker assembly to the frame of the vehicle and coupling the first rocker assembly to the first axle of the vehicle.

18. The method of claim 17, further comprising pivotally coupling a second rocker assembly to the second frame, and pivotally coupling the second rocker assembly to the frame of the vehicle and coupling the second rocker assembly to the second axle of the vehicle.

19. The method of claim 18, further comprising increasing an angle of the first and/or second rocker assemblies with respect to the frame of the vehicle to transfer a portion of the load from the second axle to the first axle and decreasing the angle of the of the first and/or second rocker assemblies with respect to the frame of the vehicle to transfer a portion of the load from the first axle to the second axle.

20. The method of claim 16, further comprising increasing the angle of the air bag with respect to the frame of the vehicle to transfer a portion of the load from the second axle to the first axle and decreasing the angle of the air bag with respect to the frame of the vehicle to transfer a portion of the load from the first axle to the second axle.

\* \* \* \* \*